(12) United States Patent
Bernstein et al.

(10) Patent No.: US 7,701,938 B1
(45) Date of Patent: Apr. 20, 2010

(54) ADVANCED MULTICAST SUPPORT FOR CABLE

(75) Inventors: Alon Shlomo Bernstein, Sunnyvale, CA (US); Harsh Parandekar, San Jose, CA (US); Toerless Eckert, Mountainview, CA (US)

(73) Assignee: Cisco Technology, Inc., San Jose, CA (US)

( * ) Notice: Subject to any disclaimer, the term of this patent is extended or adjusted under 35 U.S.C. 154(b) by 1174 days.

(21) Appl. No.: 11/292,725

(22) Filed: Dec. 1, 2005

Related U.S. Application Data (60) Provisional application No. 60/635,995, filed on Dec. 13, 2004.

(51) Int. Cl.
*H04L 12/28* (2006.01)
(52) U.S. Cl. .................. 370/390; 370/432; 370/392; 370/352; 370/270; 725/111
(58) Field of Classification Search .................. None
See application file for complete search history.

(56) References Cited

U.S. PATENT DOCUMENTS

| | | | |
|---|---|---|---|
| 5,918,019 | A | 6/1999 | Valencia |
| 6,137,793 | A | 10/2000 | Gorman et al. |
| 6,510,162 | B1 * | 1/2003 | Fijolek et al. ............. 370/432 |
| 6,819,682 | B1 | 11/2004 | Rabenko et al. |
| 7,065,779 | B1 | 6/2006 | Crocker et al. |
| 7,113,484 | B1 | 9/2006 | Chapman et al. |
| 7,139,923 | B1 | 11/2006 | Chapman et al. |
| 2002/0052927 | A1 | 5/2002 | Park |

(Continued)

FOREIGN PATENT DOCUMENTS

WO 00/72509 11/2000

OTHER PUBLICATIONS

Request for Comments: 1112 Host Extensions for IP Multicasting, S. Deering, Aug. 1989 (16 pages) http://www.ietf.org/rfc/rfc1112.txt.

(Continued)

*Primary Examiner*—Duc C Ho
(74) *Attorney, Agent, or Firm*—Marger Johnson & McCollom, P.C.

(57) ABSTRACT

Embodiments may comprise a cable network that shifts control plane functionality for multicast sessions to a cable modem termination system allowing multicast without a cable modem snooping messages from a coupled device. Another embodiment may comprise a network including a device to generate a request to join a multicast session over a cable network, a cable modem termination system in communication with the device, the cable modem termination system to receive the request from the device and to generate a flow identifier to associate with the multicast session, and a cable modem in communication with the cable modem termination system and the device, the cable modem to receive the flow identifier from the cable modem termination system and forward the multicast session to the device from the cable modem termination system based on the flow identifier. Other embodiments may comprise an apparatus that has a port to receive a request from a cable modem to join a multicast session, and circuitry to generate a flow identifier to associate with the multicast session and communicate the flow identifier to the cable modem to allow the cable modem to forward the multicast session to a device.

25 Claims, 6 Drawing Sheets

U.S. PATENT DOCUMENTS

| | | | |
|---|---|---|---|
| 2002/0093955 | A1 | 7/2002 | Grand et al. |
| 2002/0131403 | A1 | 9/2002 | Desai et al. |
| 2002/0131426 | A1 | 9/2002 | Amit et al. |
| 2002/0133618 | A1 | 9/2002 | Desai et al. |
| 2002/0136203 | A1 | 9/2002 | Liva et al. |
| 2002/0141585 | A1 | 10/2002 | Carr |
| 2004/0163129 | A1 | 8/2004 | Chapman et al. |
| 2004/0244043 | A1 | 12/2004 | Lind et al. |
| 2005/0265376 | A1 | 12/2005 | Chapman et al. |
| 2005/0265392 | A1 | 12/2005 | Chapman et al. |
| 2005/0265397 | A1 | 12/2005 | Chapman et al. |
| 2006/0034278 | A1* | 2/2006 | Hundscheidt et al. ....... 370/390 |
| 2006/0126505 | A1* | 6/2006 | Denney et al. .............. 370/229 |
| 2006/0168612 | A1 | 7/2006 | Chapman et al. |
| 2008/0151823 | A1* | 6/2008 | Quigley et al. .............. 370/329 |
| 2009/0098643 | A1* | 4/2009 | Mastrototaro et al. .... 435/287.1 |

OTHER PUBLICATIONS

ITU-T J.122 (Dec. 2002) "Series J: Cable Networks and Transmission of Television, Sound Programmer and Other Multimedia Signals, Interactive systems for digital television distribution," *Second-generation transmission systems for interactive cable television services—IP cable modems* (506 pages).

Postel, J., "User Datagram Protocol", RFC 768, Aug. 28, 1980, 3 pgs.

Postel, Jon, Editor, "DARPA Internet Program Protocol Specification", RFC 791, Sep. 1981, 45 pages.

Deering, S., "Host Extensions for IP Multicasting", RFC 1112, Aug. 1989.

Droms, R., "Dynamic Host Configuration Protocol", RFC 2131, Mar. 1997.

Townsley, W., et al., "Layer Two Tunneling Protocol "L2TP"", RFC 2661, Aug. 1999, 80 pages.

Cable Television Laboratories, Inc., "Data-Over-Cable Service Interface Specifications DOCSIS 2.0, Radio Frequency Specification", SP-RFIv2.0-I04-030730, 1999-2003, 512 pages.

Cable Television Laboratories, Inc., "Data-Over-Cable Service Interface Specifications DOCSIS 2.0, Radio Frequency Interface Specification", CM-SP-RFIv2.0-I08-050408, Annex C, pp. 339-390, Copyright 1999-2005.

Cable Television Laboratories, Inc., "Data-Over-Cable Service Interface Specifications DOCSIS 2.0, Radio Frequency Specification", CM-SP-RFIv2.0-I09-050812, 1999-2005, 534 pages.

Cable Television Laboratories, Inc., "DOCSIS® Set-top Gateway (DSG) Interface Specification" CM-SP-DSG-I02-040804, Copyright 2001-2004.

Cable Television Laboratories, Inc., "DOCSIS® Set-top Gateway (DSG) Interface Specification" CM-SP-DSG-I04-050408, Copyright 2001-2005.

Bhattacharyya, et al., "An Overview of Source-Specific Multicast (SSM)", RFC 3569, Jul. 2003.

Droms, R., et al., "Dynamic Host Configuration Protocol for IPv6 (DHCPv6)", RFC 3315, Jul. 2003.

Droms, R., "Stateless Dynamic Host Configuration Protocol (DHCP) Service for IPv6", RFC 3736, Apr. 2004.

Chapman, John T., "CMTS Remote PHY for a DOCSIS Network: DMPI Over IP Protocol Specification", RP-SP-DoIP-D1-040715B. doc, Cisco Systems, Inc., EDCS-387722, May 26, 2004.

Cisco Systems, Inc., DHCP and the DOCSIS Configuration File for Cable Modems (DOCSIS 1.0), Document ID: 10961, Sep. 16, 2004.

IEEE Standards, "802.16, IEEE Standard for Local and Metropolitan Area Networks, Part 16: Air Interface for Fixed Broadband Wireless Access Systems", IEEE Std. 802.16—2004, Oct. 1, 2004, 893 pages.

Cable Television Laboratories, Inc., "Data-Over-Cable Service Interface Specifications Modular CMTS", CM-SP-DEPI-W03-050302, 49 pgs., Copyright 2005.

Ramakrishnan, Sangeeta, "Next Generation Edge—Realizing the vision of shared resources and bandwidth", SCTE Conference on Emerging Technologies, Jan. 11-13, 2005, 16 pgs.

Chapman, John T., "Remote PHY Technical White Paper Addendum," Downstream External PHY Interface Specification, Cisco Systems, Inc., EDCS-377253, Jan. 24, 2005.

Cisco Systems, Inc., "Downstream External PHY Interface Specification", SP-DEPI-W2-041101A.DOC, EDCS-408926, Jan. 25, 2005.

Lau, J., et al., "Layer Two Tunneling Protocol—Version 3 (L2TPv3)," RFC 3931, Mar. 2005, 94 pages.

Cable Television Laboratories, Inc., "DOCSIS Radio Frequency Interface Specification", CM-SP-RFIv2.0-I10-051209, 538 pgs., Dec. 9, 2005.

Madvinsky, et al., Don't Let Your Modem Be Cloned, Jun. 2000, pp. 1-7, Communications Technology.

Millet, Theft of Service-Inevitable?, Dec. 2005, pp. 1-4, Communications Technology.

ETSI, Data-Over-Cable Systems Part 2 Radio Frequency Interface Specifications, Jan. 2003, pp. 59-66, ES 201 488-2 V1.2.1.

Desai, et al., FastChannel: A Higher-Speed Cable Data Service, AT&T Labs-Research, pp. 1-13.

Adoba, et al., Extensible Authentication Protocol (EAP), RFC 3748, Jun. 2004, pp. 1-64, Standards Track.

ITU-T Telecommunication Standardization Sector of ITU, Series J: Cable Networks And Transmission Of Television, Sound Programme And Other Multimedia Signals, Interactive Systems For Digital Television Distribution, Recommendation J.122, Dec. 2002, 506 pages, International Telecommunication Union.

* cited by examiner

ADVANCED MULTICAST SUPPORT FOR CABLE

RELATED APPLICATIONS

This application claims priority of U.S. provisional patent application Ser. No. 60/635,995, filed Dec. 13, 2004, titled ADVANCED DATA OVER CABLE SERVICE INTERFACE SPECIFICATION (DOCSIS) SYSTEM, which is incorporated herein by reference.

BACKGROUND

The Internet has changed society and is as much a part of modern culture as television and telephones. People are becoming increasingly connected to share and access information. This interconnectivity promotes improvements in the computing and communication infrastructure.

Much of this infrastructure was designed for entertainment or communication, but is being adapted to deliver general data. The addition of general information and data transmission over the legacy infrastructure has necessarily been somewhat restrained by the need for the infrastructure to continue its initial functions. Furthermore, legacy technical characteristics of this infrastructure influence the various solutions to include information storage and transmission. Most major entertainment and communication channels now include computer networking capabilities.

Many people get their television service through cable television (CATV). CATV was initially developed to deliver television signals to areas where antennas had difficulty picking up television broadcasts. Coaxial cabling is the primary type of cabling used by the cable television industry because it is much less susceptible to interference and can carry large amounts of data.

Television signals are broadcast in 6 MHz channels and this channel bandwidth was incorporated into cable television. As transmission demands increased, parts of the coaxial backbone were replaced with optical fiber to create a hybrid fiber-coaxial (HFC) network. The bandwidth of the cable infrastructure makes it an attractive technology to incorporate data transmission.

An example use of data over a cable television network was approved by the International Telecommunications Union (ITU) which includes interface requirements for high speed data communication, and is called the data over cable service interface specification (DOCSIS).

Cable service providers also offer internet service through the cable television network in 6 MHz channels for downstream data. Upstream data has historically received less bandwidth and has been offered in a fraction of a channel, such as in 2 MHz provisions. This asymmetry was due to the Internet initially being an information provider. Currently, peer-to-peer computing, file sharing, gaming, and other uses have increased the need for upstream bandwidth.

Due to the legacy CATV infrastructure primarily being a broadcast channel, there are different modulation schemes for upstream and downstream transmission, for example, downstream utilize 64 and 256 Quadrature Amplitude Modulation (QAM) and upstream utilizes Quadrature Phase Shift Keying or 16 QAM.

Furthermore, to allow maximum data transmission through different networks, DOCSIS supports use of various combinations of modulation and therefore different data rates, which in turn complicates the physical layer in these networks.

Placing upstream and downstream data onto the cable television network requires special equipment at each end of the HFC plant. On the customer end, a cable modulator/demodulator (cable modem, or CM) transmits and receives data over the cable television infrastructure and on the cable provider end a cable modem termination system (CMTS) is used to place and retrieve data from the cable television network.

Typically a CMTS broadcasts to numerous CMs over a shared channel while each CM separately sends upstream data. In this framework, a cable modem must select only the broadcast downstream data that is intended for it while it must follow an arbitration protocol to avoid data collisions with other cable modems while transmitting upstream data.

A CMTS may also multicast data. Multicast is based on the concept of a group where an arbitrary group of receivers can each receive a particular data stream. Hosts that are interested in receiving data flowing to a particular group join the group using Internet Group Management Protocol (IGMP). Hosts must be a member of the group to receive the data stream. Multicasting conserves bandwidth by simultaneously delivering a single stream of information to multiple recipients.

CMTS multicasting may be accomplished using a multicast internet protocol (IP) address. The current version of IP (IPv4) uses a 32-bit addressing scheme, often represented by 4 numbers separated by periods such as 198.133.219.25.

IP Multicast delivers source traffic to multiple receivers without adding additional burdens on the source or the receivers while limiting network bandwidth consumption. Multicast routing establishes a tree that connects a source with receivers. Multicast delivery sends data across this tree towards receivers. Data is not copied at the source, but rather, inside the network at distribution branch points. Only a single copy of data is sent over links that lead to multiple receivers, resulting in bandwidth gains.

For example, multicast packets may be replicated in a network by a router enabled with Protocol Independent Multicast (PIM) and other supporting multicast protocols. Unlike broadcast, the traffic is only received and processed by devices that are listening for it. Videoconferencing, stock quotes, news, distance learning, and distribution of software, etc., are example applications that benefit from multicasting.

DOCSIS 2.0 defines several hooks for enabling multicast over the radio frequency (RF) portion of a cable network. IGMP snooping in a CM can be used to trigger a Baseline Privacy Interface (BPI) exchange for a multicast session. IGMP snooping restrains multicast traffic and specifies how a host can register a router to receive specific multicast traffic. BPI extensions can be used to provide encryption of multicast sessions.

In conventional DOCSIS, a user at an end device may want to join a certain multicast session. For example, the device may present a web page with a channel descriptor to the user and the user can select which channel they want to view or which multicast session they want to attend. The channel descriptor may associate that channel or session with the destination IP address used in the actual multicast. To receive the multicast session or channel, the end device may send an IGMP join message to a CMTS or other server asking to join the multicast group.

In DOCSIS 2.0, a CM snoops these IGMP join messages, and when it sees an end device wants to receive a certain channel or multicast session, the CM maps a multicast address to a MAC address using RFC 1112 mapping, and uses that MAC address to set an Ethernet filter to restrain multicast traffic.

Additionally, when the CM snoops the IGMP join and gets the MAC address for the filter, the CM may negotiate a key exchange with an associated CMTS in order to decrypt the desired multicast session and forward it to the end device. Unfortunately, this conventional approach for enabling multicast traffic over a cable network does not address many multicast issues.

The current multicasting scheme allows for aliasing of traffic. According to the request for comments (RFC) 1112, aliasing of traffic may happen because only the lower order 23 bits of an IP address are mapped to a multicast Ethernet media access control (MAC) address.

A MAC address is a layer 2 unique identifier attached to most forms of networking equipment. MAC addresses may be mapped to a layer 3 protocol address and back, for example, by an address resolution protocol (ARP) or a reverse ARP (RARP). Unfortunately this can result in aliasing when the lower order 23 bits of an IP address are the same, for example, a CM configured to receive traffic for group 224.1.2.3 will also accept traffic for 239.1.2.3.

Aliasing is particularly an issue with virtual private network (VPN) and source-specific multicast (SSM) support. For VPNs, two separate networks might have the same addressing scheme, and therefore the same Ethernet MAC address. For SSM, two multicast groups might differ only by a source address, since Ethernet MAC mapping takes only the destination into account, this may also result in aliasing.

DOCSIS 2.0 also provides only limited support for multicast protocols. It does not have IGMP snooping support for IGMPv3 and SSM, Generic Attribute Registration Protocol (GARP), GARP Multicast Registration Protocol (GMRP) or Multicast Listener Discovery (MLD). This discrepancy is in large part due to the different length headers and different representations in each of the headers. This will continue to be a problem as new versions of these protocols likely will generate additional changes in their headers and therefore complicate snooping of these protocols to establish multicast sessions.

DOCSIS 2.0 leaves many other multicast issues unaddressed. One area left unaddressed is support for IP Version 6 (IPv6) since IPv6 has a dedicated control plane for multicast. Additionally, PacketCable Multimedia (PCMM) does not yet define how multicast is to be supported, and there are no appropriate hooks in DOCSIS 2.0 to support it.

Another area is limited monitoring at a CMTS. For example, IGMP v1/v2 reports may be suppressed and subsequently, it is not possible to obtain a list of CMs that joined a multicast session.

Quality of Service (QoS) is also not addressed for multicast flows under conventional DOCSIS. Multicast flows can be thought of as unidirectional flows, and in that respect, they are supported by DOCSIS specifications. However, the details on how QoS is assigned to multicast flows are not defined because unlike other DOCSIS flows they are not owned by a single modem.

Another multicast area left unaddressed by conventional DOCSIS is in routed networks on the customer premises equipment (CPE) side. The network cannot easily support routers connected in the CPE network that run Protocol Independent Multicast (PIM) instead of IGMP. Additionally, in conventional DOCSIS there is no way for either a CM or CMTS to make sure a multicast session is successfully activated since there is no explicit acknowledgment in IGMPv2.

Support for multicast in current cable networks is limited in scope in at least the areas explained above. What is needed is a new multicast approach in cable networks.

SUMMARY

Embodiments may comprise a cable network that shifts control plane functionality for multicast sessions to a CMTS to provide for multicast over a cable network. This may be accomplished by the CMTS identifying a multicast session and communicating that identification to a CM. In this embodiment, a CMTS may use a multicast flow label, a BPI key, or rewrite a MAC address on the RF portion of a cable network, as flow identifiers to establish a multicast session through a CM without the CM having to snoop messages in order to establish the multicast session.

Embodiments of the invention may comprise a network including a device to generate a request to join a multicast session over a cable network, a cable modem termination system in communication with the device, the cable modem termination system to receive the request from the device and to generate a flow identifier to associate with the multicast session, and a cable modem in communication with the cable modem termination system and the device, the cable modem to receive the flow identifier from the cable modem termination system and forward the multicast session to the device from the cable modem termination system based on the flow identifier.

Other embodiments may comprise an apparatus that has a port to receive a request from a cable modem to join a multicast session, and circuitry to generate a flow identifier to associate with the multicast session and communicate the flow identifier to the cable modem to allow the cable modem to forward the multicast session to a device.

Yet another embodiment may be a method comprising receiving a request from a cable modem to join a multicast session, generating a flow identifier to associate with the multicast session, using a control plane protocol to communicate the flow identifier to the cable modem, and forwarding the multicast session through the cable modem to a device. Some embodiments may comprise a machine readable medium comprising instructions that when executed cause a device to perform the present embodiment method.

Another embodiment may be an apparatus comprising means for receiving a request from a cable modem to join a multicast session, means for generating a flow identifier to associate with the multicast session, means for using a control plane protocol to communicate the flow identifier to the cable modem, and means for forwarding the multicast session through the cable modem to a device.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Embodiments may provide multicast for cable networks in a manner that shifts control plane functionality to a CMTS, relieving a CM from having to support a wide range of present and future multicast protocols. Generally, by shifting multicast control functions to a CMTS, a CM no longer needs to snoop messages from an end device in order to provision the CM for multicast service to the end device. This provides for a more robust and efficient system overall to provide for multicasting over the RF portion of a cable network.

The control plane functionality may be shifted to the CMTS by in multiple ways. In an embodiment, a CMTS may generate a multicast flow identifier and exchange that with the CM so that the CM may receive and forward a multicast session. Since RFC 1112 states that a multicast MAC address contains the lower 23 bits of the IP multicast destination address, this leads to address aliasing and issues with SSM and virtual local area network (VLAN) support.

Example flow identifiers may be communicated with a new explicit label in a DOCSIS header to identify a multicast flow. This flow identifier may be created upon receiving a request from a device to join a multicast flow and may therefore be any assigned value by the CMTS. An example explicit label would be a type, length, value (TLV) for a DOCSIS header. In this example, a new TLV may be used to communicate a flow identifier where the type is new type allocated for this extended header to convey the flow identifier, the length may be 4 bytes, and the value could be the flow identifier.

A CM may filter multicast flows and forward them based on the flow identifier. For example, a network layer service is provided for in an SSM environment as a "channel", and is identified by an SSM destination IP address (G) and a source IP address S. A source S transmits IP datagrams to an SSM destination address G. A receiver can receive these datagrams by subscribing to the channel (Source, Group) or (S,G). Channel subscription is supported by IGMPv3 for IPv4 and by multicast listener discovery version 2 (MLDv2) for IPv6. A CMTS may designate a flow identifier for any CM that has both the S and G values, and the CM can filter using the flow identifier and forward the multicast to any CPE where appropriate.

Other embodiments may include using an encryption key, for example a BPI key, as the flow identifier or even using a MAC address rewrite approach that assigns a MAC address for the link between a CMTS and a CM. By shifting the control plane functionality to the CMTS, efficiency and control can both be improved as well as simplifying the tasks and perhaps even the architecture of CMs. This approach has additional benefits, some of which are covered below.

In an embodiment, multicast flows may be signaled in the same way that unicast flows are. In this regard the embodiment may be mostly an admission control function to keep track so multicast flows do not consume additional bandwidth, once a first multicast flow is established. Additionally, an embodiment may provide more separation between a multicast control plane and an associated multicast data plane. This embodiment allows compatibility with a wide range of multicast protocols, as well as compatibility with IPv6 and PCMM.

Figure 1:
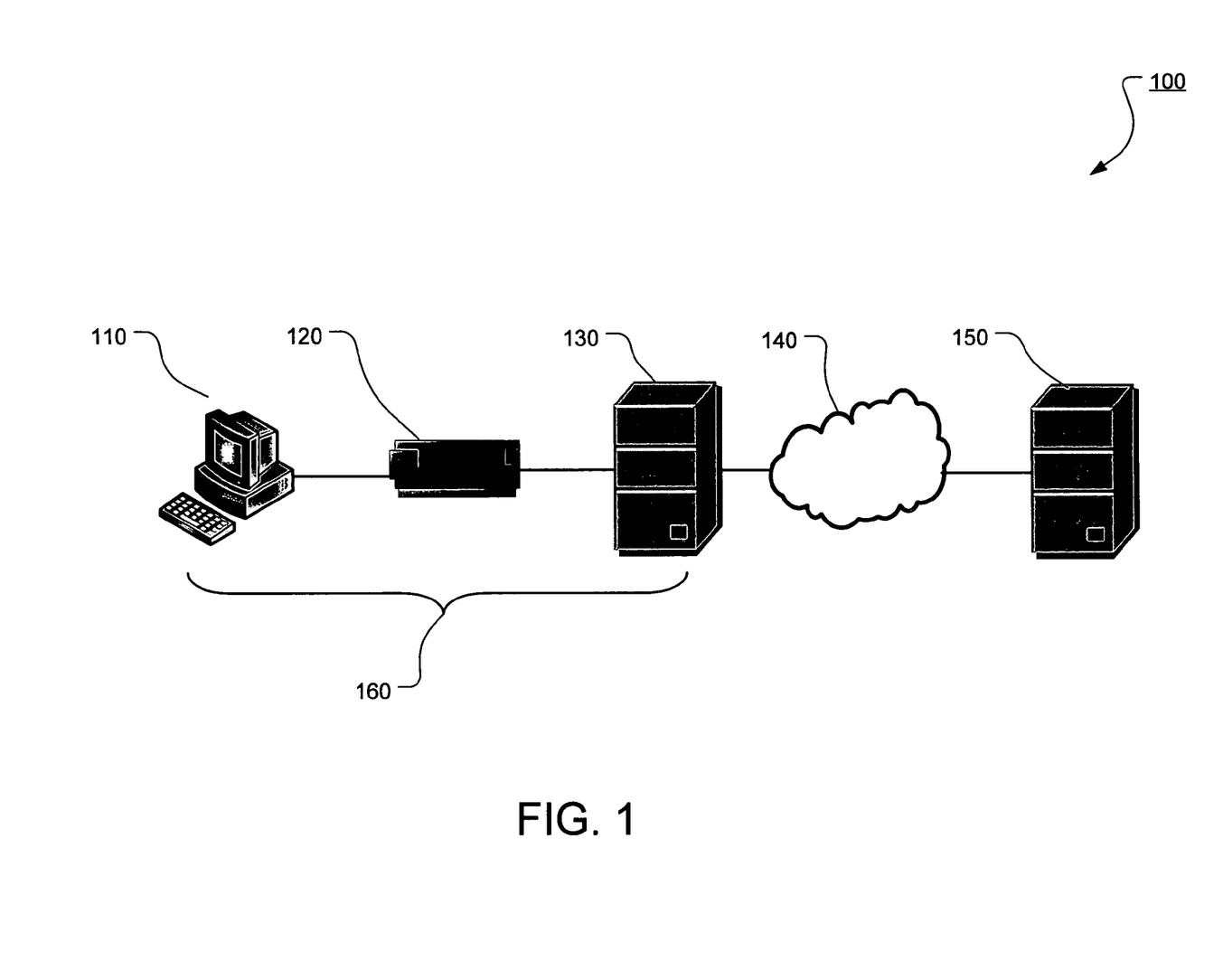
FIG. 1 illustrates a cable network that may use embodiments of the present invention.

FIG. 1 illustrates a network 100 that may include embodiments of the present invention. A personal computer (PC) is coupled with a CM 120. In other embodiments the PC 110 may be any CPE coupled through the CM 120. The PC 110 and CM 120 may be in communication with each other over a local link such as an Ethernet local area network (LAN). The PC 110 signals data to and from the modem through the local link and the CM 120 modulates the information over an RF link to a CMTS 130.

The network 100 in FIG. 1 has an RF segment 160 that includes the PC 110, CM 120 and CMTS 130. Additionally, the CM can demodulate information from the CMTS 130 and forward it to the PC 110. The CMTS 130 may be connected through a packet switched network (PSN) 140 to other servers or devices such as server 150.

As mentioned above, conventional DOCSIS enables multicast over the RF segment 160 of a network 100. When a user at a PC 110 asks to join a certain multicast session, the end device may send an IGMP join message to a CMTS 130 or other server 150 asking to join the multicast group. Currently, the CM 120 snoops these IGMP join messages, and when it detects a PC 100 requesting a certain channel or multicast session, the CM 120 copies a flow identifier, such as a MAC address, from the IGMP join and then saves this address in a filter so that the CM can receive and forward the multicast session to the end device.

IGMP is used to dynamically register individual hosts, such as PC 110, in a multicast group on a particular LAN. PC 110 identifies group memberships by sending IGMP messages to a local multicast router such as CMTS 130. Under IGMP, routers can listen to IGMP messages and periodically send out queries to discover which groups are active or inactive on a particular subnet.

Figure 2:
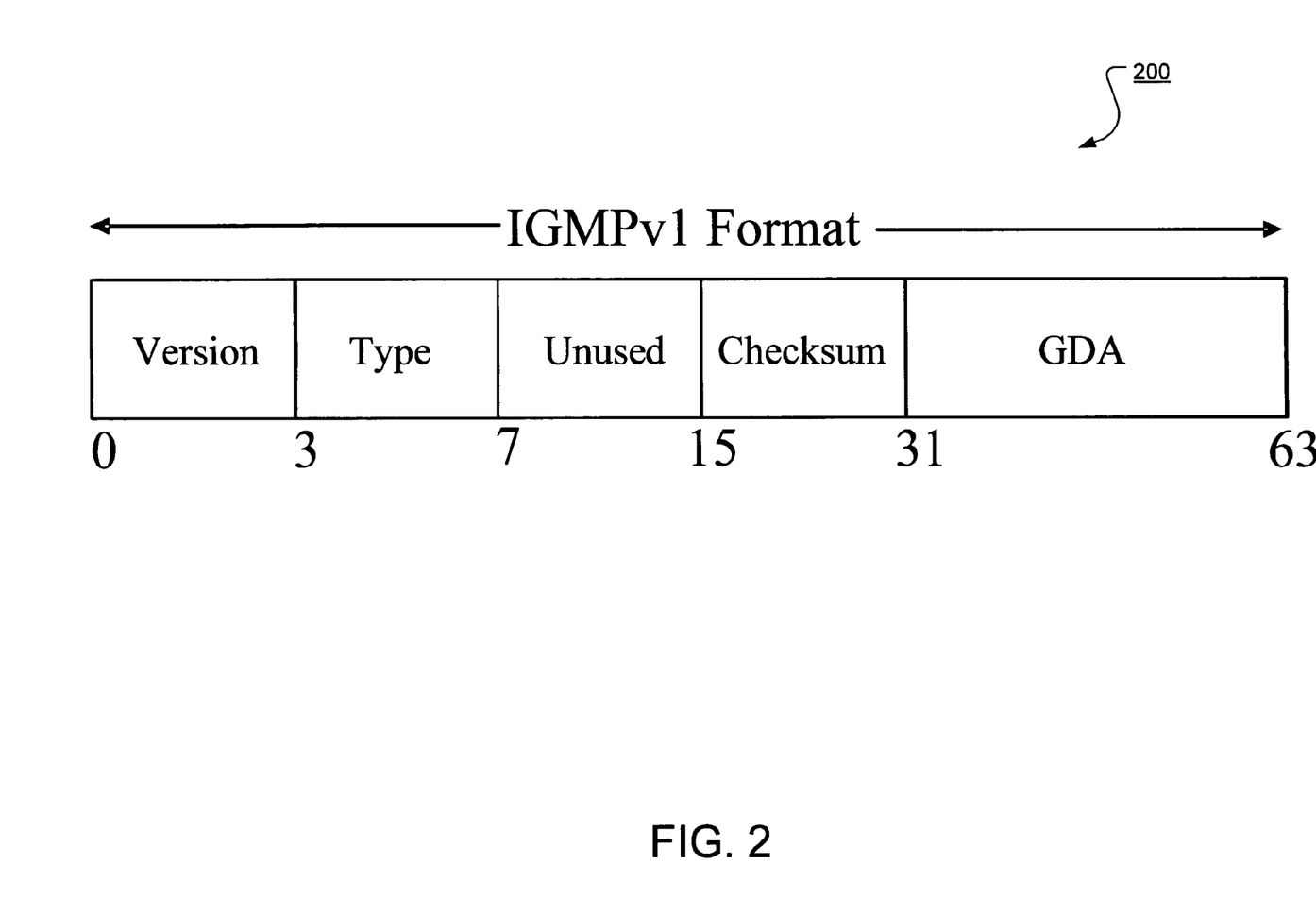
FIG. 2 illustrates an IGMPv1 message that may be used in establishing multicast sessions over a cable network.

FIG. 2 illustrates an IGMPv1 message 200 that may be used in establishing multicast sessions over a cable network. A key point with IGMPv1 is that the packet has no provision for a host to leave a multicast group. In IGMPv1, there are just two different types of IGMP messages, a membership query and a membership report.

CPE 110 can signal a router 130 to join a multicast group by sending out an IGMP membership report corresponding to a particular multicast group. A router 130 then floods the requested multicast group out of the interface where the host resides. The router 130 queries the CPE 110 by multicasting an IGMP membership query to the multicast group that the CPE 110 had requested to join. If any hosts on that subnet desire that multicast feed then they will reply to the query and multicast packets will be sent.

Additionally, the router 130 periodically sends out an IGMP membership query to verify that at least one host on the subnet is still interested in receiving traffic directed to that group. When there is no reply to three consecutive IGMP membership queries, the router 130 times out the group and stops forwarding traffic directed toward that group.

Since there is no provision to leave the multicast group the CPE 110 notifies the router 130 of it non-interest by simply not answering the routers 130 IGMP membership queries. This method is bandwidth inefficient and therefore has been replaced in IGMPv2 or later in most modem systems.

Figure 3:
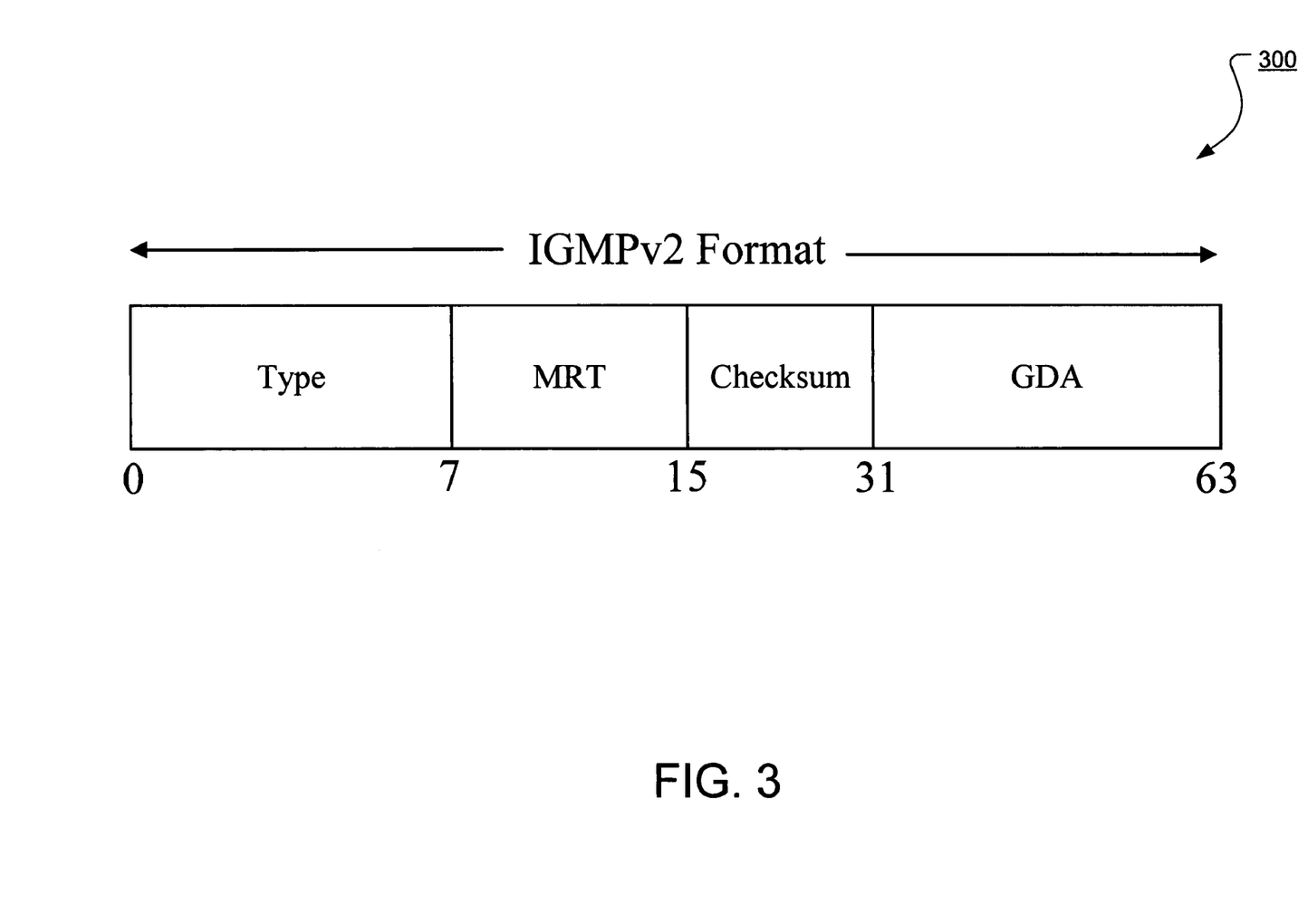
FIG. 3 illustrates an IGMPv2 message that may be used in establishing multicast sessions over a cable network.

FIG. 3 illustrates an IGMPv2 message 300 that may be used in establishing multicast sessions over a cable network.

Referring to FIG. 3, an IGMPv2 message 300 header has a different format than an IGMPv1 message 200 header. In IGMPv2, there are four types of messages, a membership query message, a version 1 membership report message, a version 2 membership report message, and a leave group message. The main difference is that there is a leave group message.

IGMPv2 improves on IGMPv1 by allowing hosts to leave a group by sending a leave message to a router 130. Since a CPE 110 can voluntarily leave the multicast group the multicast packets will stop flowing from the router 130 when the CPE 110 signals the router 130 to not receive the multicast data.

In this approach, a CPE 110 sends an IGMP leave group message to a router 130. The router 130 sends a group specific query to the multicast group asking if there are still any hosts that want to keep receiving the multicast stream. If no host responds, the flow stops. If one or more hosts respond that they want to keep receiving the flow, then the router 130 continues to forward the multicast packets.

These different versions of IGMP are particularly important for IGMP snooping since the CM 110 must know what type of IGMP it is snooping in order to get the correct bits from the header. If the wrong bits are snooped from the header, then the destination multicast IP address is not snooped, the multicast session will not be available. As IGMP message formats change to new versions, or if other types of multicast join messages are sent, this complicates the process of establishing multicast session by snooping the multicast join messages.

Figure 4:
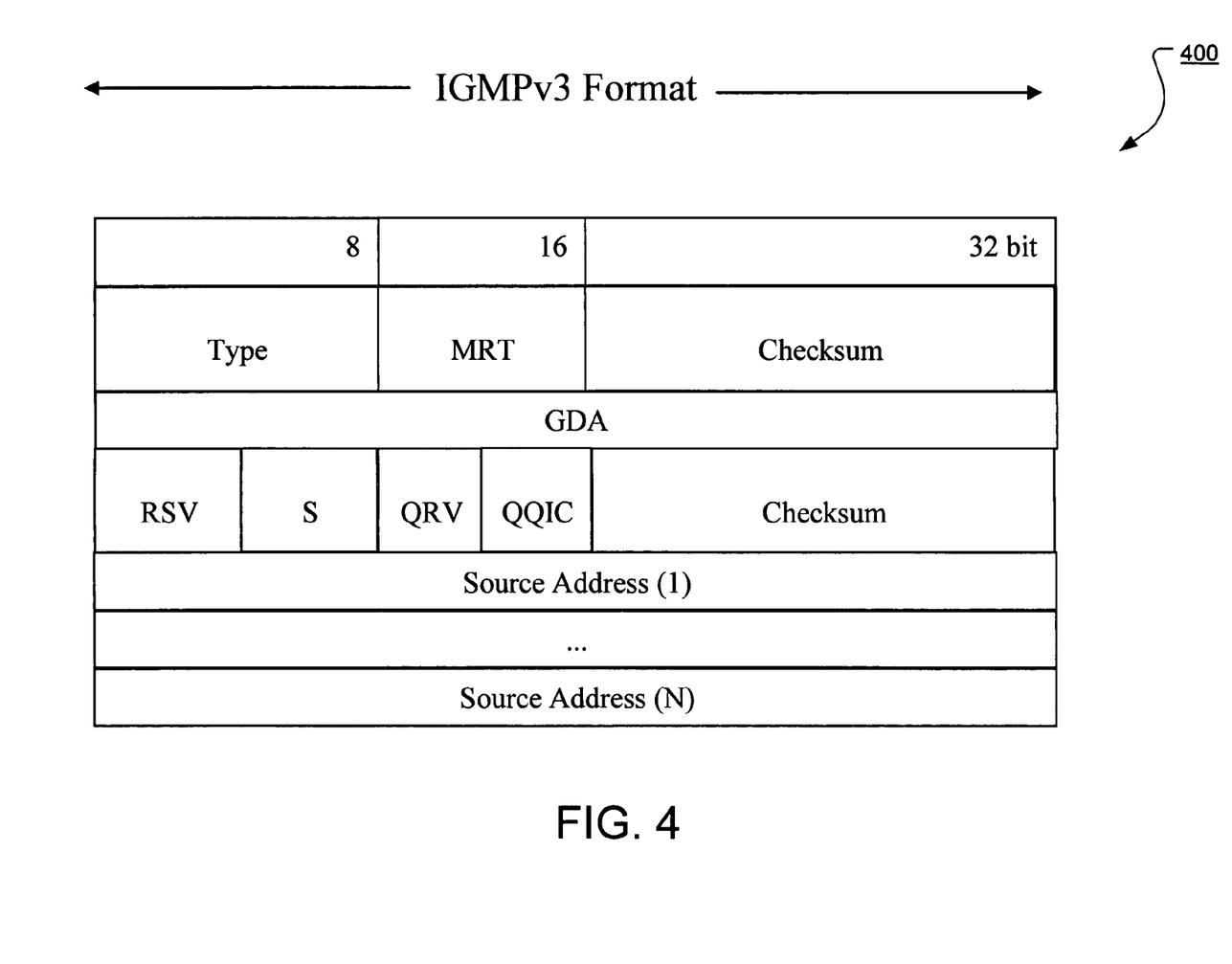
FIG. 4 illustrates an IGMPv3 message that may be used in establishing multicast sessions over a cable network.

For example, FIG. 4 illustrates an IGMPv3 as is now in use that builds upon prior IGMP versions by adding provisions for a host to not only specify a group but also specify include and exclude lists. These lists of IP addresses identify multicast sessions that a CPE 110 either will or will not accept multicast traffic from. Include and exclude functionality tends to increase security and make Denial of Service attacks considerably more difficult than was the case in prior versions. Finally it enables newer multicast protocols and will allow source and group (S,G) requests to move up to the application layer. These changes further complicate control plane functionality at a CM 120.

An embodiment may be a network 100 comprising a device, such as PC/CPE 110, to generate a request to join a multicast session over a cable network 100, a CMTS 130 in communication with the device 110, the CMTS 130 to receive the request from the device and to generate a flow identifier to associate with the multicast session, and a CM 120 in communication with the CMTS 130 and the device 110, the CM 120 to receive the flow identifier from the CMTS 130 and forward the multicast session to the device 110 from the CMTS 130 based on the flow identifier.

In the present embodiment, the device 110 may generate an Internet Group Management Protocol (IGMP) join message as the request to join a multicast session over cable network 100. In an embodiment, the CMTS 130 may generate an explicit label in a DOCSIS header to use as the flow identifier to associate with the multicast session. In some embodiments, the flow identifier may either a multicast address or a group of multicast addresses.

In some embodiments of the invention, the CMTS 130 can assign a unique MAC address from a generic pool to each unique multicast session as the flow identifier to associate with the multicast session, wherein the MAC address is used only on an RFI link. In yet another embodiment, the CMTS 130 may assign a unique BPI key as the flow identifier for each unique multicast session.

Embodiments may provide for improved multicasting over a DOCSIS network by adding multicast flow identifiers to the standard set of unicast DOCSIS specifications. An exemplary embodiment may add a multicast specific set of reserved Type, Length and Value code points (TLVs) as the multicast flow identifier.

In this embodiment, dynamic service addition, change and deletion (DSx) and registration can use these new TLVs to establish multicast flows. Embodiments can therefore move IGMP control plane handling to the CMTS 130 instead of the CM 120. Furthermore, this embodiment provides for a new software capability such as an IGMP snooping enable/disable function so that if the CMTS 130 wishes to enable IGMP snooping, it can do so, even in a DOCSIS 3.0 multicast system. DSx is one protocol to establish or manage multicast flows. Any other protocol allowing a CMTS 130 to communicate with a CM 120 to establish CM configuration may be used instead of DSx.

DSx is an existing control plane signaling protocol that may be used in an embodiment to establish multicast flows from a CMTS 130 to a CM 120. DSx allows a CM 120 to dynamically create service flows on demand. These messages are DOCSIS link layer equivalents of higher layer messages that create, tear down, and modify a service flow. For example, a DOCSIS 1.1 dynamic services state machine supports the following DSx messages:

Dynamic Service Add (DSA)—This message is used to create a new service flow.

Dynamic Service Change (DSC)—This message is used to change the attributes of an existing service flow.

Dynamic Service Deletion (DSD)—This message is used to delete an existing service flow.

Embodiments may use current flow encodings, either statically or in a DSx message exchange, to define a multicast flow. Similar to unicast flows, a multicast flow may be defined with the following building blocks.

One building block may be flow identifier definitions. An embodiment may use a standard flow encoding field. For example, in the context of multicast, a flow identifier may define a multicast group (S, G) by having source and destination IP addresses and masks.

Another building block may be QoS definitions. An embodiment may use a standard flow encoding field. For example, in the context of multicast, QoS definitions relate to the multicast session QoS. If the flow identifier matches a range of addresses, then the QoS may limit the aggregate of all the flows.

A third building block may be multicast session mapping for the purpose of filter. In this regard an embodiment may add multicast TLVs. For example, an embodiment CMTS 130 may define either a MAC re-write rule and/or BPI key that uniquely identifies multicast session and use a control plane signaling protocol such as DSx to communicate this identification to a CM 120.

Another building block may be the ability to indicate failure. In this example a DSx response may indicate a failure to allocate a resource for the multicast; for example, if a CM 120 runs out of multicast filter entries.

Figure 5:
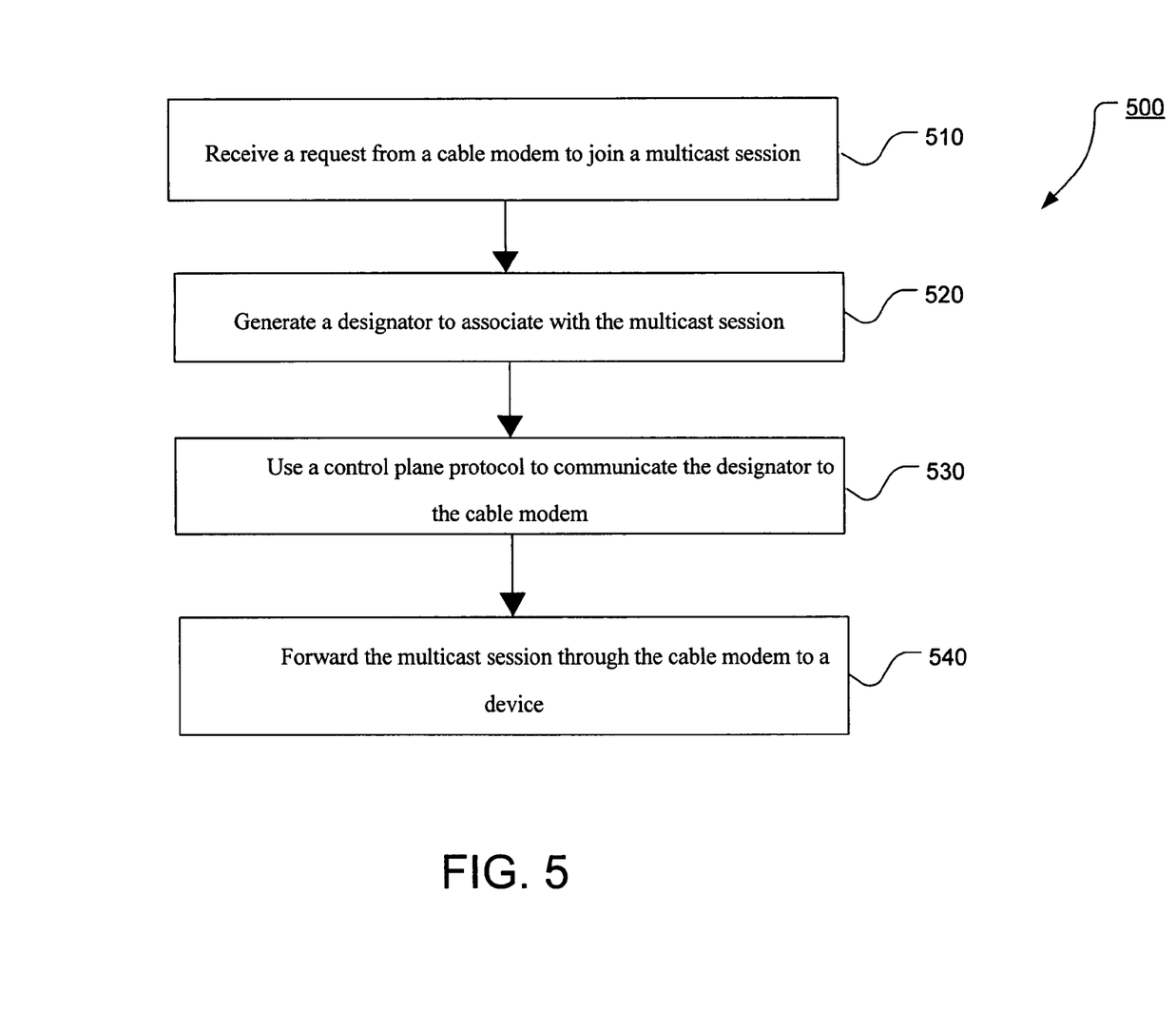
FIG. 5 illustrates an embodiment method to provide advanced multicasting over a DOCSIS network.

FIG. 5 illustrates an embodiment method 500 to provide advanced multicasting over a DOCSIS network. Referring to FIG. 5, an embodiment method may receive a request from a cable modem to join a multicast session as shown in block 510, in block 520 the method generates a flow identifier to associate with the multicast session, in block 530 an embodiment method may use a control plane protocol to communicate the flow identifier to the cable modem, and in block 540 it may forward the multicast session through the cable modem to a device.

Additionally, embodiments may comprise a machine readable medium comprising instructions to be accessed by the machine such that executing the instructions causes the machine to perform the embodiment method 500. Example machine readable mediums include CD, DVD, Flash memory, Floppy drive, firmware and any other suitable storage medium that may comprise instructions to be run on a machine.

Figure 6:
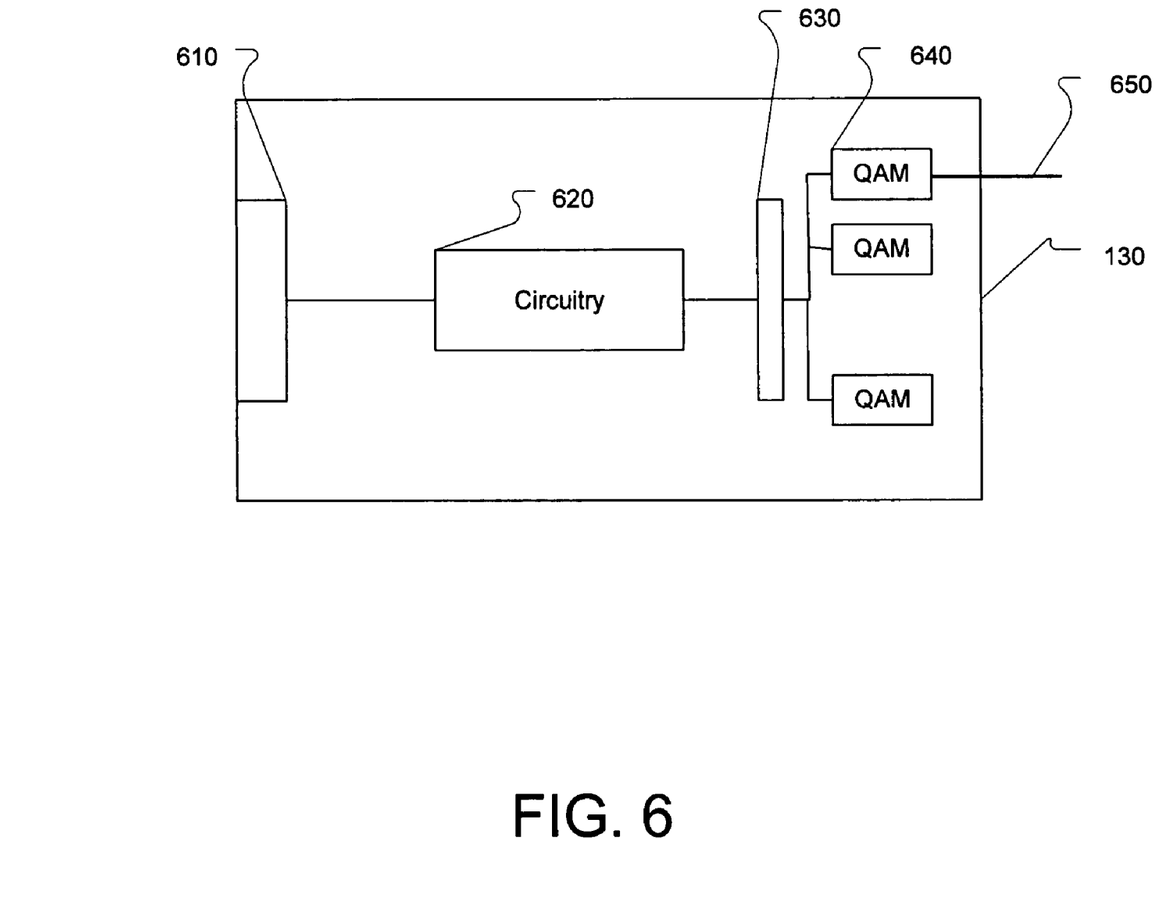
FIG. 6 illustrates an embodiment CMTS to provide for advanced multicasting over a DOCSIS network by shifting control plane functionality for multicasting to the CMTS instead of a CM.

FIG. 6 illustrates an embodiment CMTS 130 to provide for advanced multicasting over a DOCSIS network by shifting control plane functionality for multicasting to the CMTS 130 instead of a CM 120. Referring the figure, a CMTS 130 may comprise a port 650 coupled to a CM 120 (not shown), to receive DOCSIS packets over a cable interface. CMTS 130 may further comprise circuitry 620 for processing, control, etc. CMTS 130 may then convert DOCSIS packets into frames to send to a packet switched network through link 610.

In an embodiment, CMTS 130 may use port 650 to receive a request from a coupled CM coupled with a device requesting to join a multicast session. This embodiment may further comprise circuitry 620 to generate a flow identifier to associate with the multicast session and may then communicate the flow identifier to the CM 120 to allow the CM 120 to forward the multicast session to the coupled device requesting to join the multicast session.

In an embodiment, the request can be an Internet Group Management Protocol (IGMP) join message. In some embodiments, the circuitry 620 can generate an explicit label in a DOCSIS header to use as the flow identifier to associate with the multicast session. In another embodiment, the flow identifier may be either a multicast address or a group of multicast addresses. In other embodiments circuitry 620 may assign a unique MAC address from a generic pool to each unique multicast session as the flow identifier to associate with the multicast session, wherein the MAC address is used only on an RFI link, or may even assign a unique BPI key as the flow identifier for each unique multicast session.

Embodiments may therefore provide a more efficient and controlled multicast approach. For example, aliasing is handled in some embodiments the association of a multicast group to a multicast address is uniquely identified by either a specifically assigned Media Access Control (MAC) address, a BPI key, or an explicit flow label assigned by a CMTS and placed in a DOCSIS header.

Furthermore, embodiments improve the limited support for multicast protocols in current CMs. By moving the IGMP control plane processing to the CMTS, the system is not limited to "snooping" multicast, along with the inherent problems associated with snooping. Instead, the end point that was supposed to receive the multicast the CMTS is the one responding to it.

Since multicast filtering is performed at Layer 2, a CM does not need to be involved with the details of upper layer protocols to block or forward multicast traffic, including IPv6. Therefore embodiments of the present invention are also useful because the IPv6 multicast specific control plane will be handled at the CMTS.

In another embodiment, PCMM can trigger DSx message exchange from the CMTS the same way IGMP control plane protocols can. Therefore by shifting control plane functionality to a CMTS 130, PCMM can replace IGMP as a protocol for establishing multicast sessions.

Embodiments provide additional benefits such as a limited monitoring on a CMTS 130. For example, IGMP snooping and report suppression are removed from the CM, making it possible to explicitly track users that are joining or leaving multicast sessions. Additionally, QoS definitions that are embedded in a DSx/registration message exchange may be used to assign QoS to a multicast session. In an embodiment, a QoS profile can be associated with a single or multiple (S,G) sessions, either by configuration or by querying a remote agent.

Additionally, embodiments may provide for routed networks on the CPE side of the cable network. For example, if PIM is running between a CMTS 130 and a customer's router, the CMTS 130 can trigger a DSx based on a PIM state machine.

And yet another embodiment may provide an explicit JOIN acknowledgment. In this embodiment, a DSx message can return specific error codes if the multicast session cannot be established.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A network comprising:
a device to generate a request to join a multicast session over a cable network;
a cable modem termination system in communication with the device, the cable modem termination system to receive the request from the device and to generate a flow identifier to associate with the multicast session; and
a cable modem in communication with the cable modem termination system and the device, the cable modem to receive the flow identifier from the cable modem termination system and forward the multicast session to the device from the cable modem termination system based on the flow identifier, wherein the cable modem termination system generates an explicit label in a DOCSIS header to use as the flow identifier to associate with the multicast session.

2. The network of claim 1 wherein the device generates an Internet Group Management Protocol (IGMP) join message as the request to join a multicast session over a cable network.

3. The network of claim 1 wherein the flow identifier is either a multicast address or a group of multicast addresses.

4. The network of claim 1 wherein the cable modem termination system assigns a unique MAC address from a generic pool to each unique multicast session as the flow identifier to associate with the multicast session, wherein the MAC address is used only on an RFI link.

5. The network of claim 1 wherein the cable modem termination system assigns a unique BPI key as the flow identifier for each unique multicast session.

6. An apparatus comprising:
a port to receive a request from a cable modem to join a multicast session; and circuitry to:
generate a flow identifier to associate with the multicast session;
communicate the flow identifier to the cable modem to allow the cable modem to forward the multicast session to a device, wherein the circuitry can generate an explicit label in a DOCSIS header to use as the flow identifier to associate with the multicast session.

7. The apparatus of claim 6 wherein the port can receive an Internet Group Management Protocol (IGMP) join message as the request to join a multicast session over a cable network.

8. The apparatus of claim 6 wherein the flow identifier is either a multicast address or a group of multicast addresses.

9. The apparatus of claim 6 wherein the circuitry is to assign a unique MAC address from a generic pool to each unique multicast session as the flow identifier to associate with the multicast session, wherein the MAC address is used only on an RFI link.

10. The apparatus of claim 6 wherein the circuitry is to assign a unique BPI key as the flow identifier for each unique multicast session.

11. A method comprising:
receiving a request from a cable modem to join a multicast session;
generating a flow identifier to associate with the multicast session;
using a control plane protocol to communicate the flow identifier to the cable modem; and
forwarding the multicast session through the cable modem to a device, wherein generating a flow identifier includes generating an explicit label in a DOCSIS header to use as the flow identifier to associate with the multicast session.

12. The method of claim 11 wherein receiving a request includes receiving an Internet Group Management Protocol (IGMP) join message.

13. The method of claim 11 wherein the flow identifier is either a multicast address or a group of multicast addresses.

14. The method of claim 11 wherein generating a flow identifier includes assigning a unique MAC address from a generic pool as the flow identifier to associate with the multicast session, wherein the MAC address is used only on an RFI link.

15. The method of claim 11 wherein generating a flow identifier includes assigning a unique BPI key as the flow identifier for each unique multicast session.

16. An apparatus comprising:
means for receiving a request from a cable modem to join a multicast session;
means for generating a flow identifier to associate with the multicast session;
means for using a control plane protocol to communicate the flow identifier to the cable modem; and
means for forwarding the multicast session through the cable modem to a device, wherein means for generating a flow identifier includes means for generating an explicit label in a DOCSIS header to use as the flow identifier to associate with the multicast session.

17. The apparatus of claim 16 wherein means for receiving a request includes means for receiving an Internet Group Management Protocol (IGMP) join message.

18. The apparatus of claim 16 wherein the flow identifier is either a multicast address or a group of multicast addresses.

19. The apparatus of claim 16 wherein means for generating a flow identifier includes means for assigning a unique MAC address from a generic pool as the flow identifier to associate with the multicast session and the MAC address is used only on an RFI link.

20. The apparatus of claim 16 wherein means for generating a flow identifier includes means for assigning a unique BPI key as the flow identifier for each unique multicast session.

21. A computer readable medium containing instructions that when executed cause a cable modem termination system to:
receive a request from a cable modem to join a multicast session;
generate a flow identifier to associate with the multicast session;
use a control plane protocol to communicate the flow identifier to the cable modem;
forward the multicast session through the cable modem to a device; and
cause the cable modem termination system to generate an explicit label in a DOCSIS header to use as the flow identifier to associate with the multicast session.

22. The computer readable medium of claim 21 further comprising instructions that when executed further cause the cable modem termination system to receive an Internet Group Management Protocol (IGMP) join message as a request to join a multicast session.

23. The computer readable medium of claim 21 wherein the flow identifier is either a multicast address or a group of multicast addresses.

24. The computer readable medium of claim 21 further comprising instructions that when executed further cause the cable modem termination system to assign a unique MAC address from a generic pool as the flow identifier to associate with the multicast session, wherein the MAC address is used only on an RFI link.

25. The computer readable medium of claim 21 further comprising instructions that when executed further cause the cable modem termination system to assign a unique BPI key as the flow identifier for each unique multicast session.

* * * * *